US012773371B1

(12) United States Patent
Tran

(10) Patent No.: US 12,773,371 B1
(45) Date of Patent: Oct. 27, 2026

(54) TRIGGER POINT AND ROLLER THERAPY SYSTEMS

(71) Applicant: Khoa Van Tran, San Antonio, TX (US)

(72) Inventor: Khoa Van Tran, San Antonio, TX (US)

( * ) Notice: Subject to any disclaimer, the term of this patent is extended or adjusted under 35 U.S.C. 154(b) by 695 days.

(21) Appl. No.: 18/168,807

(22) Filed: Feb. 14, 2023

Related U.S. Application Data

(60) Provisional application No. 63/310,440, filed on Feb. 15, 2022.

(51) Int. Cl.
*A61H 15/00* (2006.01)
*A61H 39/04* (2006.01)

(52) U.S. Cl.
CPC ......... *A61H 15/0092* (2013.01); *A61H 39/04* (2013.01); *A61H 2015/0028* (2013.01); *A61H 2015/0035* (2013.01); *A61H 2201/0153* (2013.01); *A61H 2201/0157* (2013.01); *A61H 2201/0192* (2013.01); *A61H 2201/1685* (2013.01); *A61H 2201/169* (2013.01)

(58) Field of Classification Search
CPC .... A61H 15/0092; A61H 15/00; A61H 39/04; A61H 2015/0035; A61H 2201/169; A61H 2201/0119–013; A61H 2201/0138–0146; A61H 2201/0161; A61H 2201/0107; A61H 1/006–008; A61H 2015/0007–0057
See application file for complete search history.

(56) References Cited

U.S. PATENT DOCUMENTS

| | | | | | |
|---|---|---|---|---|---|
| 896,484 | A * | 8/1908 | Thomas | A61H 15/0092 | 601/120 |
| 1,572,794 | A * | 2/1926 | Hamilton | A61H 15/00 | 606/240 |
| 2,183,726 | A * | 12/1939 | Sommer | A61H 15/02 | 222/281 |
| 2,347,327 | A * | 4/1944 | London | A61H 15/00 | 482/132 |
| 3,078,484 | A * | 2/1963 | Briggs | A47K 7/043 | 4/606 |
| 5,935,090 | A * | 8/1999 | Kennon | A61H 15/0092 | 601/134 |
| 7,087,004 | B1 * | 8/2006 | Berke | A61H 7/002 | 601/134 |
| 7,645,248 | B2 * | 1/2010 | Brown | A61H 37/00 | 601/128 |

(Continued)

FOREIGN PATENT DOCUMENTS

| | | | | |
|---|---|---|---|---|
| FI | 11173 U1 * | 3/2016 | A61H 15/02 |
| RU | 208082 U1 * | 12/2021 | A61H 15/00 |

*Primary Examiner* — Tu A Vo
(74) *Attorney, Agent, or Firm* — Volk & McElroy, LLP; Michael D. Volk, Jr.

(57) ABSTRACT

A trigger point and roller therapy device for myofascial release of the psoas muscle area includes a base having a base plate and a pair of guide brackets defining grooves, and a single pair of wheeled brackets removably coupled to the base. The wheeled brackets are adjustable to adjust the lateral distance between the wheels. Each wheel rotates about a central axis parallel to the base plate, enabling a user to apply concentrated trigger point pressure to a target area of the psoas and roller therapy by urging the body forward and backward to treat nearby tissues while the base remains stationary on the floor.

6 Claims, 5 Drawing Sheets

(56) References Cited

U.S. PATENT DOCUMENTS

| | | | | |
|---|---|---|---|---|
| D615,662 | S | 5/2010 | Turner | |
| 9,107,795 | B2 | 8/2015 | Faussett | |
| D755,304 | S | 5/2016 | Ackerman | |
| 9,687,416 | B2 | 6/2017 | Turner | |
| 9,849,065 | B1 * | 12/2017 | Kozlevcar | A61H 39/04 |
| 9,901,508 | B2 | 2/2018 | Fitzmaurice | |
| D825,695 | S | 8/2018 | Kim | |
| 10,052,255 | B2 * | 8/2018 | Harvel | A61H 15/00 |
| 10,137,055 | B2 | 11/2018 | Lawrie | |
| D927,009 | S * | 8/2021 | Feuerstein | D24/211 |
| D928,336 | S | 8/2021 | Mollohan | |
| 2008/0146979 | A1 * | 6/2008 | Brown | A61H 37/00 601/115 |
| 2011/0021959 | A1 * | 1/2011 | Brown | A61H 15/00 601/122 |
| 2011/0166481 | A1 * | 7/2011 | Rhoad | A61H 7/002 248/231.51 |
| 2012/0028765 | A1 * | 2/2012 | Morin | A63B 23/1227 482/91 |
| 2014/0150184 | A1 | 6/2014 | Jones | |
| 2015/0231016 | A1 * | 8/2015 | Stearns | A61H 7/007 601/136 |
| 2015/0245977 | A1 * | 9/2015 | Sungarian | A61H 15/0092 601/118 |
| 2015/0257962 | A1 * | 9/2015 | Shannon | A61H 15/00 601/98 |
| 2016/0338901 | A1 * | 11/2016 | Cohen | A61H 15/00 |
| 2019/0038500 | A1 * | 2/2019 | Lehti | A61H 15/00 |
| 2019/0262220 | A1 * | 8/2019 | Smith | A61H 15/0078 |
| 2020/0060927 | A1 * | 2/2020 | Bailey | A61H 15/00 |
| 2022/0008284 | A1 | 1/2022 | Smith et al. | |
| 2022/0096314 | A1 * | 3/2022 | Nagy | A61H 15/00 |
| 2022/0347036 | A1 * | 11/2022 | Dossman | A63B 23/035 |

* cited by examiner

TRIGGER POINT AND ROLLER THERAPY SYSTEMS

CROSS-REFERENCE TO RELATED APPLICATIONS

This application claims the benefit of U.S. Provisional Application No. 63/310,440, filed Feb. 15, 2022, the contents of which are not admitted to be prior art by mention in this cross-reference section.

DETAILED DESCRIPTION

Figure 1:
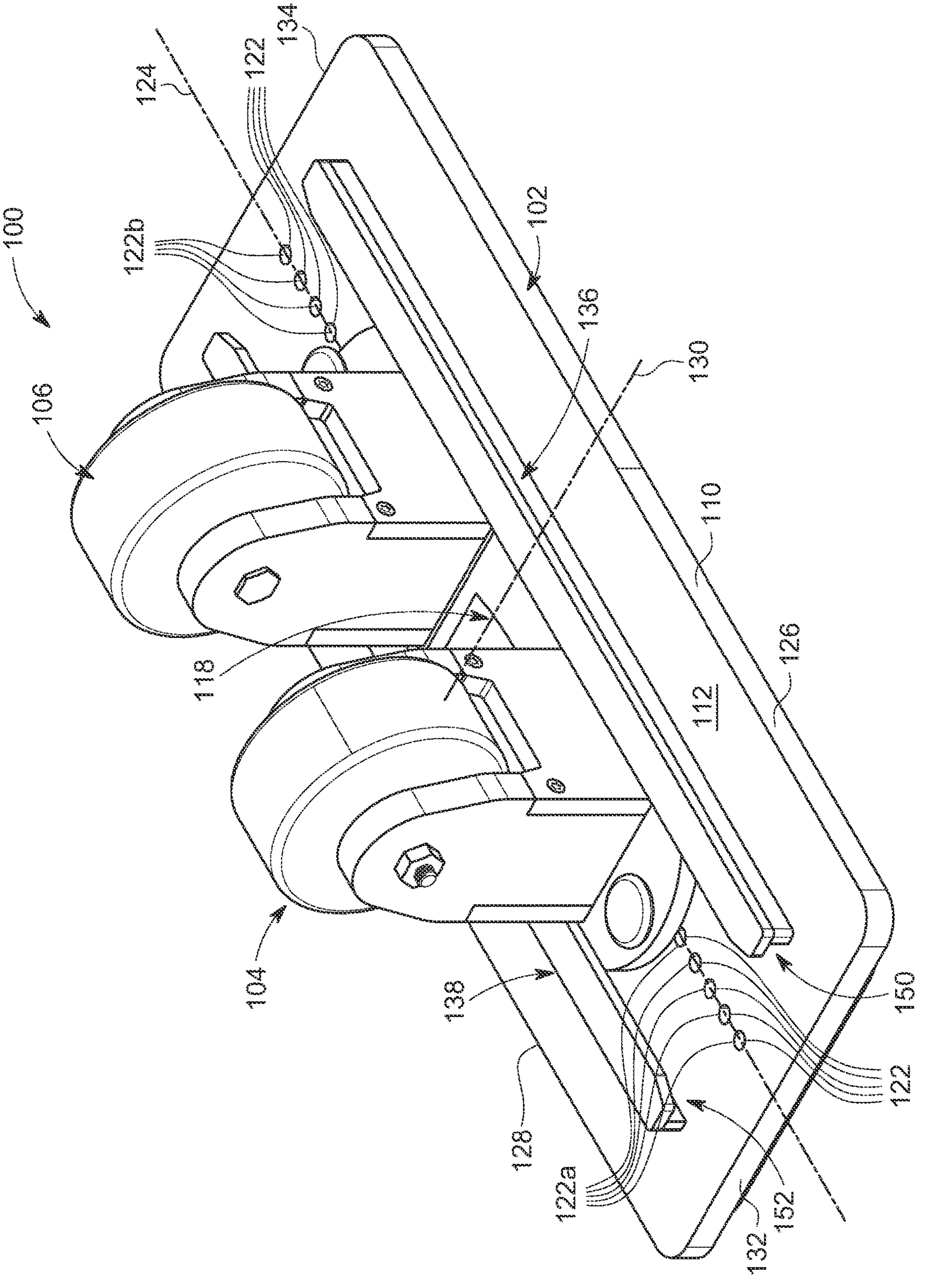
FIG. 1 shows a perspective view of a trigger point and roller therapy device of the present disclosure.

The present disclosure is directed to trigger point and roller therapy systems. The implementations of the disclosed system are useful for self-administered myofascial release.

Myofascial release is a therapeutic technique that aims to release tension and pain in the body's soft tissue structures, specifically the fascia. Fascia is a connective tissue that surrounds, support and separate muscles, bones, nerves, and organs in the body. When the fascia is tight or restricted, it can lead to pain, discomfort, and limited range of motion. Myofascial release techniques can help to alleviate this tension and improve overall muscle function and mobility. Additionally, myofascial release can also help to improve circulation, increase range of motion and flexibility, reduce muscle soreness, and improve posture. It is also beneficial for people with chronic pain conditions. Overall, myofascial release is a powerful tool for promoting overall muscle and body health and function.

The psoas muscle plays a critical role in the function of the human body. As the only muscle connecting the spine to the legs, it is responsible for flexing the hip and stabilizing the lumbar spine. Due to its location and the fact that it is often tight and contracted, the psoas muscle can easily become overworked and fatigued. This can lead to a range of issues including lower back pain, hip pain, and even referred pain in the legs and feet. Implementations of the present disclosure are useful in providing myofascial release techniques to the psoas muscle. By providing targeted myofascial release to the psoas muscle, such implementations can help to alleviate these issues noted above and promote overall muscle health and function. Additionally, because the psoas muscle is so closely linked to the nervous system, releasing tension in this muscle can also have a positive impact on overall relaxation and stress levels in the body.

With references to the figures, a trigger point and roller therapy device is disclosed. As further described herein, the device is placed on a flat surface, such as the floor, and a user selects a desired width between the brackets. Next, the user will position a particular portion of their body over the roller wheels. The foam roller wheels will provide pressure on the body part to be treated. One major advantage of the wheels is that, since the wheels roll, the user can treat nearby areas without raising their body completely off the foam roller wheels. The user can urge their body forward and backward to roll out the area and also target a new trigger point.

According to one implementation of the present disclosure, a trigger point and roller therapy device comprises a base (portable but stationary when used), a pair of wheeled brackets connectable to the base, and each wheeled bracket of the pair of wheeled brackets supports a wheel comprising at least exterior foam that can rotate about an axis. The width between the wheeled brackets can be adjusted. A user will select the width based on the body part being treated or the size of the user. For example, if the neck is to be treated, the brackets will be set closer to one another than if the psoas or lower back are being treated.

Figure 2:
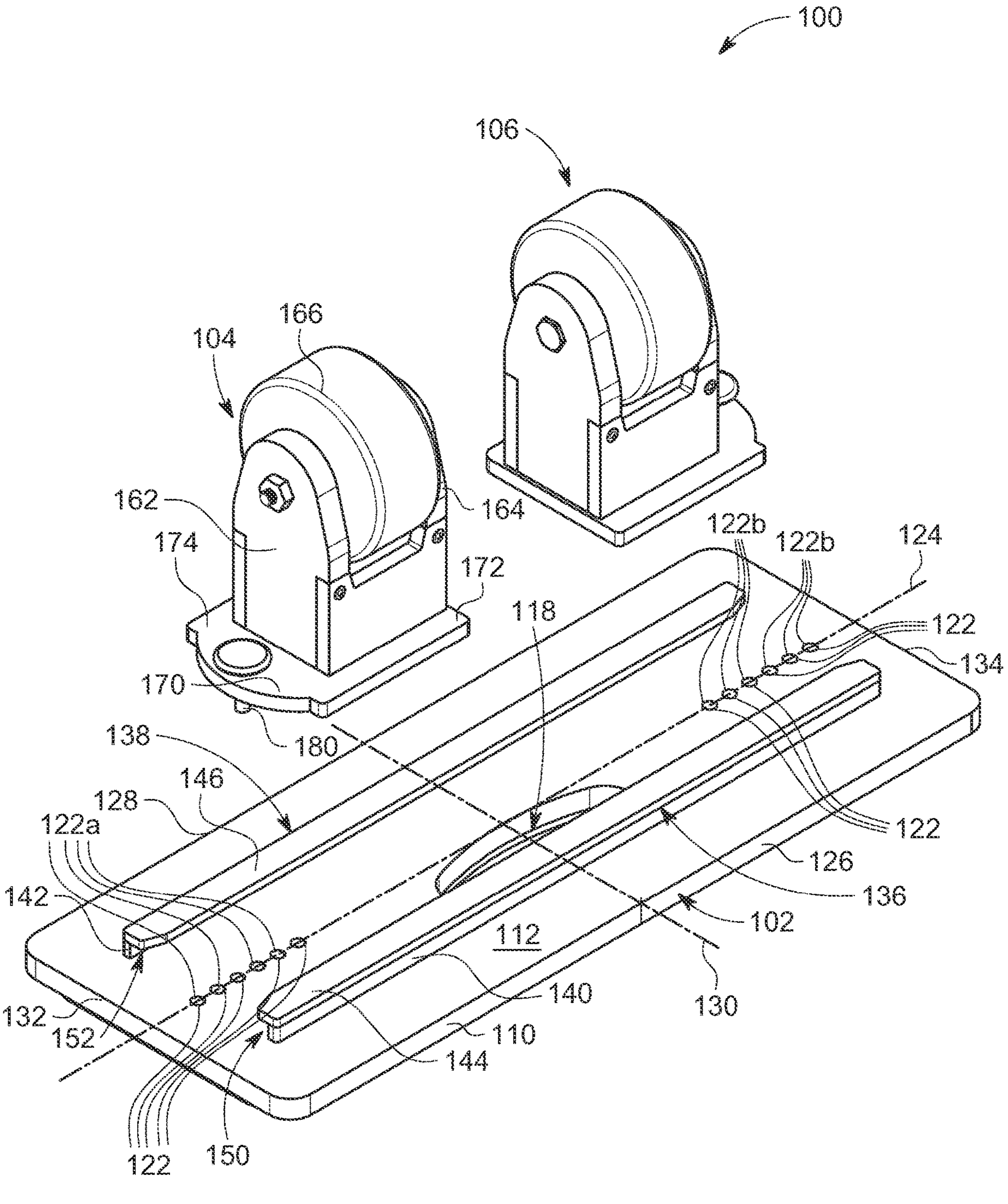
FIG. 2 shows an exploded view of the trigger point and roller therapy device of FIG. 1.
Figure 3:
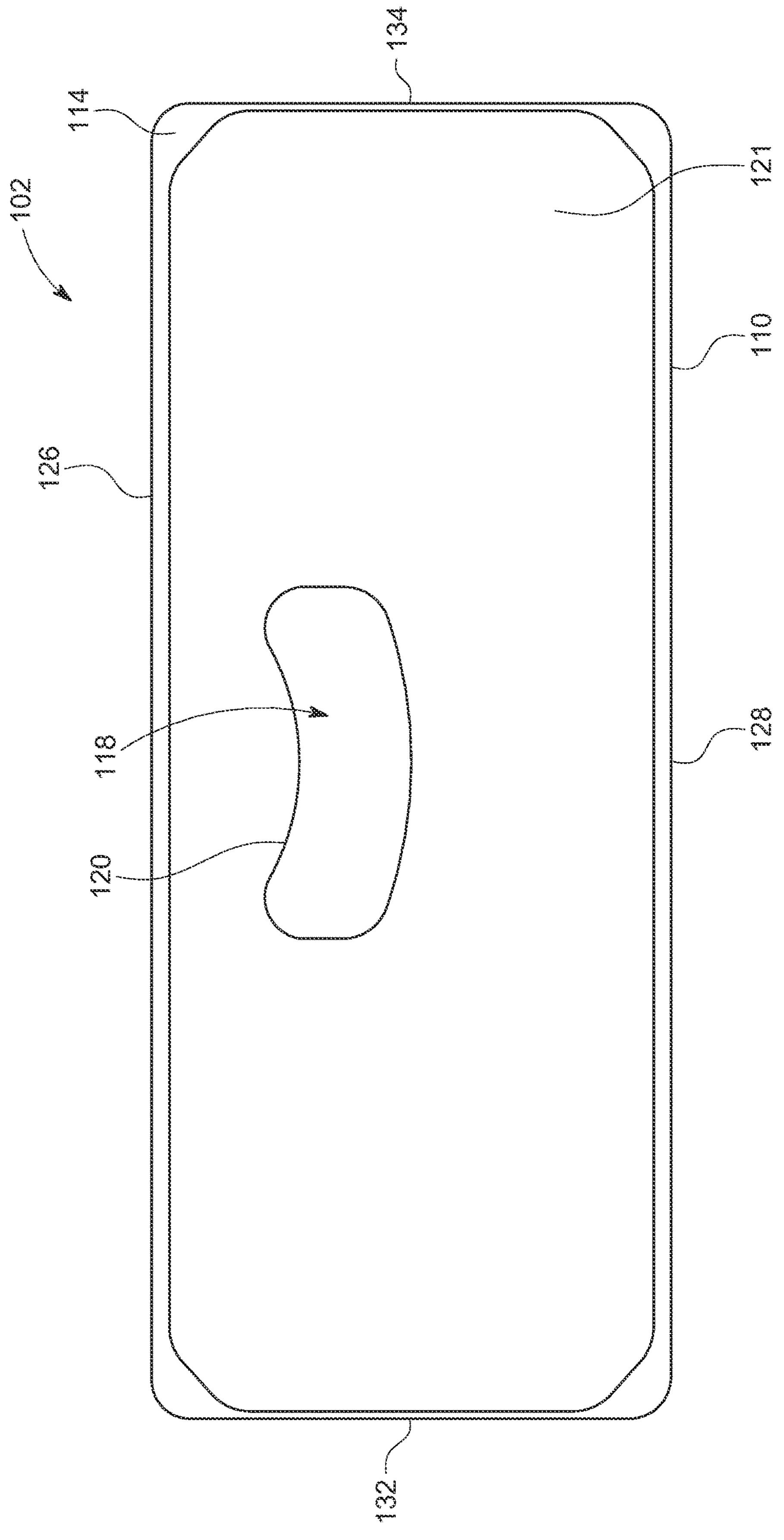
FIG. 3 shows a bottom view of a base of the trigger point and roller therapy device of FIG. 1.

Referring to FIGS. 1 and 2, a trigger point and roller therapy device 100 is shown, according to an implementation of the disclosure. Device 100 includes a base 102 and a pair of wheeled brackets 104, 106 adapted to be removably engaged with the base 102 at a plurality of mounting positions. Base 102 includes a base plate 110 adapted be positioned on a flat surface, such as the floor, and configured to support the device 100 on the floor. As shown, the base plate 110 may include a substantially rectangular configuration having a first surface 112 and a second surface 114 opposite to first surface 112. In some implementations, a groove 118 defining a handle 120 of base 102 facilitates holding and lifting of the base 102. In some implementation, groove 118 may be centrally positioned on base 102. In other implementations, groove 118 may be slightly off center. In yet other implementations, groove 118 may be absent. Moreover, in some implementations, second surface 114 of base plate 110 may comprise a non-slip layer 121 (shown in FIG. 3) to restrict/prevent a slipping of the base 102 (especially when in use) when arranged on a surface. The non-slip layer may be a layer of rubber or similar material applied to second surface 114.

Base plate 110 defines a plurality of openings 122 arranged substantially centrally to a width of base plate 110 and arrayed in a direction substantially parallel to longitudinal sides 126, 128 defining a central longitudinal axis 124 of base plate 110. Openings 122 extend from first surface 112 to second surface 114 and are arranged spaced apart from each other. More particularly, openings 122 include a set of first openings **122*a* arranged on a first side of central groove 118 (i.e., central lateral axis 130) and a set of second openings 122*b* arranged on a second side of the central groove 118 (i.e., central lateral axis 130). As shown, the set of first openings 122*a* are arrayed between a first lateral side 132 of the base plate 110 and the central groove 118, while the set of second openings 122*b* are arrayed between a second lateral side 134 of the base plate 110 and the central groove 118. Accordingly, the openings 122 are arranged symmetrically about the central lateral axis 130 of the base plate 110. Openings 122 define the plurality of mounting positions for the wheeled brackets 104, 106. As shown in FIGS. 1 and 2, the set of first openings 122*a* define the plurality of mounting positions for the first wheeled bracket 104, while the set of second openings 122*b* define the plurality of mounting positions for the second wheeled bracket 106**.

Base 102 includes a pair of guide brackets 136, 138 coupled to first surface 112 of base plate 110. Guide brackets 136, 138 extend substantially parallel to longitudinal sides 126, 128 of base plate 110. As shown, the pair of guide brackets, for example, a first guide bracket 136 and a second guide bracket 138, are arranged spaced apart and substantially parallel to each other defining a lateral gap therebetween. As shown, the two guide brackets 136, 138 are arranged on opposite sides of central longitudinal axis 124 such that first guide bracket 136 is arranged proximate to a first longitudinal side 126, while second guide bracket 138 is disposed proximate to a second longitudinal side 128. As shown, each of the guide brackets 136, 138 includes an "L-shape" having a first plate 140, 142 with a first end engaged/attached to first surface 112 of base plate 110 and extending vertically upwardly/outwardly from first surface 112, and a second plate 144, 146 engaged/attached to a second end of the associated first plate 140, 142 and extending substantially parallel to the base plate 110.

First guide bracket 136 defines a first groove 150 having openings at ends of the first guide bracket 136, and the second guide bracket 138 defines a second groove 152 having openings at ends of the second guide bracket 138. First groove 150 and second groove 152 are configured to receive first wheeled bracket 104 and second wheeled bracket 106, and facilitate the sliding of the wheeled brackets 104, 106 in a direction parallel to the central longitudinal axis 124 to enable the mounting of the wheeled brackets 104, 106 at desired mounting positions among the plurality of mounting positions. Also, first plates 140, 142 of the guide brackets 136, 138 act as a stopper to prevent the movement of the wheeled brackets 104, 106 in a direction substantially perpendicular to the central lateral axis 130 relative to the base plate 110, while the second plates 144, 146 restrict the movement of the wheeled brackets 104, 106 in the vertical direction relative to the base plate 110.

Figure 4:
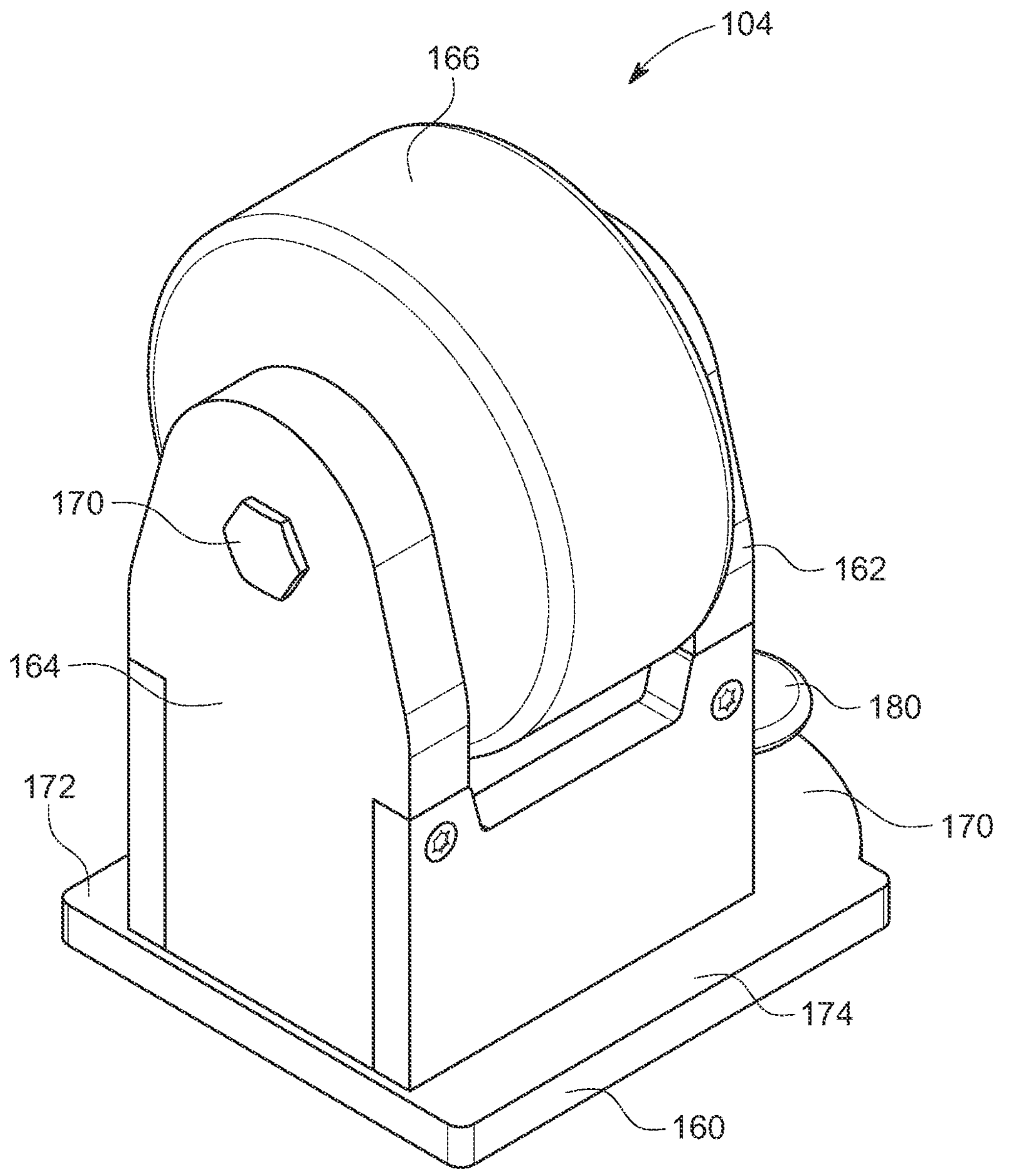
FIG. 4 shows a perspective view a wheeled bracket of trigger point and roller therapy device of FIG. 1.
Figure 5:
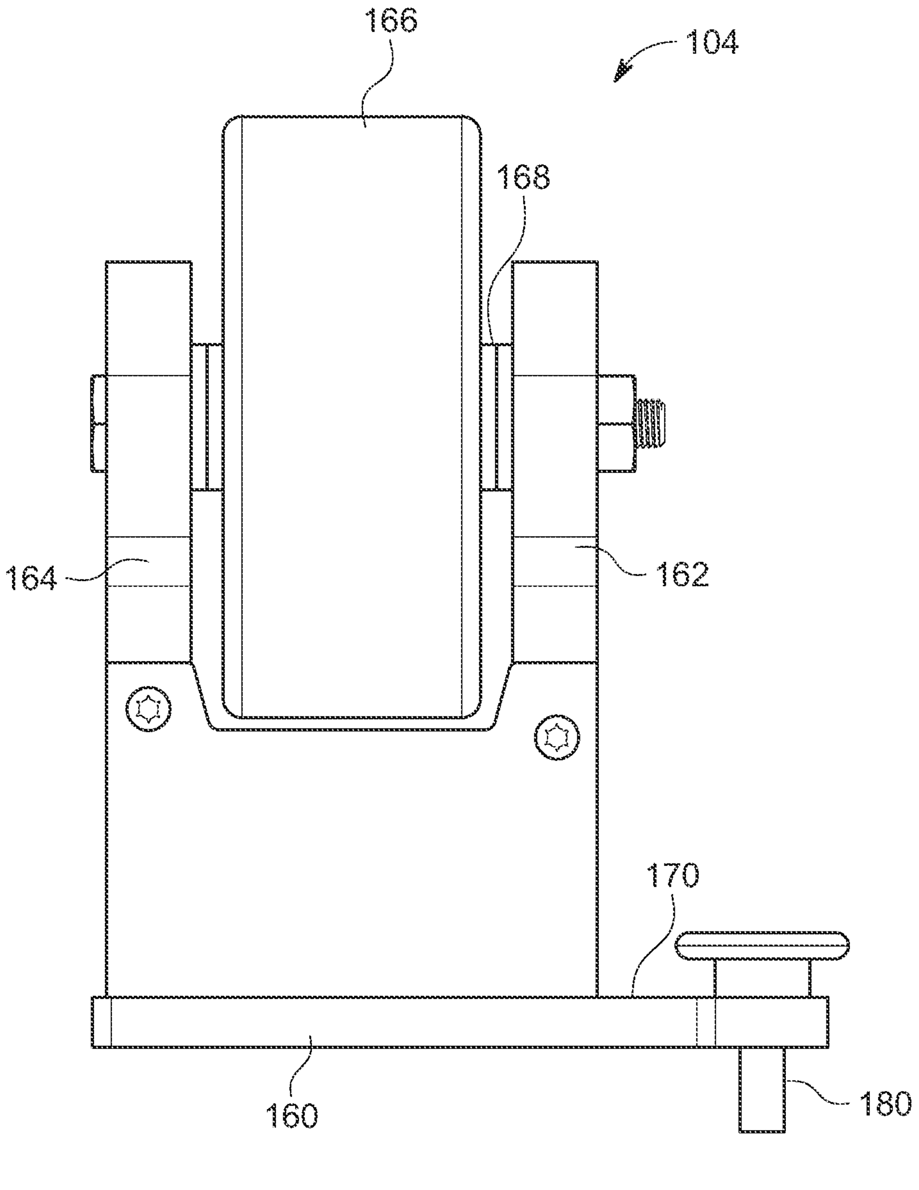
FIG. 5 shows a front view the wheeled bracket of FIG. 4.

The wheeled brackets 104, 106 are identical in construction, structure, and assembly, and therefore, for the sake of clarity and brevity, the construction, the structure, and the assembly of only one wheeled bracket, for example, the first wheeled bracket 104, is explained in detail. Referring to FIGS. 2, 4, and 5, first wheeled bracket 104 includes a bottom plate 160, and a pair of support plates 162, 164 extending vertically upwardly/outwardly from the bottom plate 160 and arranged substantially parallel and spaced apart from each other. Further, first wheeled bracket 104 includes a wheel 166 arranged between the support plates 162, 164 and coupled to the support plates 162, 164. As shown, a portion of the wheel 166 extends outwardly and above the upper ends of the support plates 162, 164, and the wheel 166 is coupled to the support plates 162, 164 via a shaft 168 connected/secured proximate to the upper ends of the support plates 162, 164. The wheel 166 is rotatably supported on the shaft 168 and is configured to rotate about a central axis of the shaft 168 in either direction. In some implementation, wheel 166 is a foam wheel. The wheel 166 of first wheeled bracket 104 is a foam wheel. The foam may be polyethylene foam, ethylene vinyl acetate foam, expanded polypropylene foam, ethylene vinyl acetate foam with a polyvinyl chlorine core. Other foam materials may suffice. In some implementations, the wheels of the both the wheeled brackets 104, 106 may include identical type of foam. In some implementations, device 100 may be provided with two or more sets of wheels with foam types that are of different hardness or densities. Wheel 166 shown in FIGS. 1, 2, 4, and 5 is substantially smooth. In other implementations, wheel 166 may have various surface projections, ridges, or knobs. In yet other implementations, wheel 166 may be constructed of plastic or similar rigid material with a foam outer layer (akin to a tire on a vehicle wheel). In such implementations, foam outer layer may be replaced with foams of different hardness. In some implementations, the width of wheel 166 is about 1¼ inches. In other implementation, the width of wheel 166 is about 1 inch. In yet other implementations, the width of wheel 166 is about 1½ inches. Other wheel widths and dimensions may suffice.

As shown, support plates 162, 164 are engaged to bottom plate 160 such that portions of bottom plate 160 extend outwardly defining a flange. A first portion of bottom plate 160 extends outwardly from one of the support plates 162, 164, namely, first support plate 162, in a first direction, i.e., a longitudinal direction, defining a first extension 170 of the bottom plate 160. A second portion of bottom plate 160 extends outwardly from a second support plate 164, in a second direction, i.e., a first lateral direction, defining a second extension 172 of bottom plate 160. A third portion of the bottom plate 160 extends outwardly of support plates 162, 164, in a third direction, i.e., a second lateral direction, opposite to the second direction, defining a third extension 174 of the bottom plate 160. The second extension 172 is configured to be engage inside first groove 150, while the third extension 174 is configured to be engage inside second groove 152, in an assembly of the first wheeled bracket 104 with base 102. First extension 170 extends in a direction substantially parallel to the central longitudinal axis 124 when the first wheeled bracket 104 is coupled to base 102. To secure first wheeled bracket 104 to a desired mounting position out of the plurality of mounting positions, first wheeled bracket 104 includes a pin 180 coupled to first extension 170 of bottom plate 160 and extending downwardly of a bottom surface of bottom plate 160. Accordingly, the support plates 162, 164 and the pin 180 extend in opposite directions from the bottom plate 160.

In some implementations, pin 180 is biased in an extended position (shown in FIGS. 2 and 4) and is configured to move to a retracted position when a retraction force is applied on pin 180. First wheeled bracket 104 is secured to base 102 at a desired mounting position by inserting pin 180 in one of the first openings **122*a* corresponding to the desired mounting position. To remove pin 180 from the associated first opening 122*a* and to enable sliding of first wheeled bracket 104 relative to base 102 and along the central longitudinal axis 124, pin 180 is moved to a retracted position by pulling pin 180 away from bottom plate 160. Similarly, second wheeled bracket 106 is arranged and secured to a desired mounting position by inserting the associated pin inside the second opening 122*b*** associated with the desired mounting position.

In some implementations, pin 180 is a knobbed retractable spring-loaded plunger pin that is biased in an extended position as noted above. In some implementations, pin 180 is a knobbed twist-to-lock, retractable spring-loaded plunger. Twist-to-lock, retractable spring-loaded plungers are biased in an extended position, but may be locked in a retracted position by rotating an associated knob or gripping portion when retracted thereby locking the pin in the retracted position. The user can return the pin to the extended position by rotating the associated knob or gripping portion to the original position. In other implementations, other locking pins may suffice.

A method for using the device 100 for performing trigger point and roller therapy is now described. The method includes positioning the device 100 on a suitable surface, such as a floor. The device 100 is positioned on the floor such that the non-slip layer 121 abuts the floor. Due to the presence of non-slip layer 121, potential slippage of the device 100 relative to the floor, during the trigger point and roller therapy, is restricted/eliminated. Subsequently, the first wheeled bracket 104 and the second wheeled bracket 106 are moved to the desired mounting positions by adjusting a longitudinal gap between the two wheeled brackets 104, 106. One or both the wheeled brackets 104, 106 are slid relative to the base 102 and along the lengths of the first and second grooves 150, 152 to position the wheeled brackets 104, 106 at the desired mounting positions. The desired mounting positions of the wheeled brackets 104, 106 are secured when the pins of the wheeled brackets 104, 106 are aligned with openings 122 corresponding to the desired mounting position. For example, at the desired mounting position of the first wheeled bracket 104, pin 180 of the first wheeled bracket 104 aligns with one of the first openings 122*a* corresponding to the desired mounted position. Further, wheeled brackets 104, 106 are secured at the desired mounting positions by inserting the pins inside the openings 122 to prevent the sliding of the wheeled brackets 104, 106 relative to the base 102 during the trigger point and roller therapy.

As the wheeled brackets 104, 106 are adapted to be displaced/slide relative to the base 102, a user can select and adjust the longitudinal gap between the wheeled brackets 104, 106 based on, for example, the body part being treated or the size of the user. For example, if the neck is to be treated, the wheeled brackets 104, 106 may be set closer to one another than if the psoas or lower back are to be treated. Thereafter, a user positions a portion of the body part, for example, the psoas, the neck, the lower back, or any other body part that need to be treated, over wheels 166. The force of the user pushing down on wheels 166 will provide pressure to the tissues of the body part to be treated. The user can adjust the amount of pressure by positioning their body on the wheels with more force or less force, depending on the desired pressure. One major advantage of wheels 166 is that the user can treat nearby areas without getting up and completely off wheels 166. The user can urge their body forward and backward to target nearby areas. Further, the user may roll out the area being treated by urging their body forward and backward.

Device 100 provides a compact configuration for portability and storage. For storage and transporting device 100 from one location to another location, various components, for example, wheeled brackets 104, 106 may be removed from the base 102 in a rapid manner. For removing the first wheeled bracket 104, a user may move pin 180 to the retracted position by pulling pin 180 away from bottom plate 160, thereby enabling sliding of first wheeled bracket 104 relative to base 102. Thereafter, the user may slide the first wheeled bracket 104 towards one of the lateral sides, for example, the first lateral side 132 of base plate 110 and remove first wheeled bracket 104 from grooves 150, 152 through the end openings of the grooves 150, 152 arranged proximate to the first lateral side 132. In this manner, the user may disengage the first wheeled bracket 104 from the base 102. Similarly, the second wheeled bracket 106 may be disengaged from the base 102. Also, the user may use the handle 120 or central groove 118 to lift the base 102 from the floor or position the base 102 (and hence the device 100) on the floor.

To assemble the wheeled brackets 104, 106 with the base 102, the base 102 may be positioned on the floor. Thereafter, the first wheeled bracket 104 is engaged with the base 102 by inserting the second extension 172 and the third extension 174, respectively, inside the first groove 150 and the second groove 152 through the end openings of the grooves 150, 152 disposed proximate to the first lateral side 132 of the base plate 110. Subsequently, the first wheeled bracket 104 is secured to the base plate 110 by inserting the pin 180 into one of the first openings 122*a*. It may be appreciated that the first wheeled bracket 104 is inserted inside the guide brackets 136, 138 such that the first extension 170 is arranged facing the first lateral side 132 of the base plate 110. Similarly, the second wheeled bracket 106 may be inserted inside the first groove 150 and the second groove 152 and is secured to the base plate 110.

As noted above, issues with the psoas muscle may be treated with the device. One such routine using device 100 would proceed according to the following the description. Device 100 is placed on the floor and support bracket are spaced so that the wheels 166 contact the psoas muscle when a user is lying prone over the wheels. The user would begin by applying pressure on the psoas near a line that goes through the belly button for a given time. The user would then make slight urges forward and backward to target nearby tissues. Next, the user would reposition their body at a position roughly between the L1 and L2 lumbar vertebrae and treat that area for a given time period. Next, the user would reposition their body at about the L3 lumbar vertebrae and treat that area for a given time. Next, the user would reposition their body at about the lower hip area and treat that area for a given time. Next, the user would reposition their body at about the upper hip area and treat that area for a given time. Next, the user would reposition the wheeled brackets closer to one another so that the lateral gap is minimized. The user would then apply pressure and roll from about the L1 lumbar vertebrae to about the L5 lumbar vertebrae. Next, the user would reposition the wheeled brackets further from one another so that the lateral gap is larger. The user would then apply pressure and roll from about the L3 lumbar vertebrae down to below mid hip level. It should be noted that numerous other treatment plans could be developed for the psoas, other body parts, and ailments. It is further noted that the device of the present disclosure has many features (adjustability of the wheeled brackets and ability to roll forward and backward on the wheels) that allow for customized treatment plans.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Many modifications and other implementations of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims.

What is claimed is:

1. A trigger point and roller therapy device for myofascial release of a psoas muscle, the device comprising:

a base having a base plate having a periphery, the base plate configured to be positioned on a flat surface during use, and a pair of guide brackets coupled to the base plate, the pair of guide brackets spaced apart and substantially parallel to each other, a pair of grooves, each of the pair of guide brackets defines a groove of the pair of grooves, each groove of the pair of grooves extending through the respective guide bracket from a first open end to a second open end;

only a single pair of wheeled brackets, a wheeled bracket of the only single pair of wheeled brackets is insertable into and removable from the pair of grooves via the first end or the second end, wherein each of the only single pair of wheel brackets are removably coupled to the base and configured to extend inside the grooves of the pair of guide brackets and slide along the grooves to adjust a distance between the wheeled brackets, the only single pair of wheeled brackets located within the periphery of the base plate, each wheeled bracket of the only single pair of wheeled bracket includes a wheel supported on a shaft connected between a pair of wheel support plates of the respective wheeled bracket, each wheel of the pair of wheels supported to a fixed height by the respective pair of wheel support plates, each wheel of the pair of wheels configured to rotate about a central axis of the respective shaft for the respective wheel of the pair of wheels, the central axis of the respective shaft being parallel to the base plate, each of the pair of wheels adapted to contact and apply a pressure on the psoas muscle of a body of a user to enable myofascial release;

each wheel of the wheels is configured to roll forward and backward in a direction perpendicular to the respective central axis responsive to the user urging their body forward and backward while the base remains stationary on a flat surface; and wherein the base plate comprising a plurality of opening arrayed along a central longitudinal axis of the base plate to enable mounting of each of the only single pair of wheeled brackets at a plurality of mounting positions, each wheeled bracket of the only single pair of wheeled brackets comprising a locking mechanism configured to selectively engage one of the plurality of openings to secure the respective wheeled bracket at a desired mounting position of the plurality of mounting positions, the plurality of openings comprising a set of first openings to enable mounting of a first wheeled bracket of the only single pair of wheeled brackets at the plurality of mounting positions and a set of second openings to enable the mounting of a second wheeled bracket of the only single pair of wheeled brackets at the plurality of mounting positions, wherein the base plate comprising a handle opening defining a handle portion, the handle opening configured to allow the user's fingers to be inserted through to grip the base plate, the handle opening extends through an upper surface of the base plate and a lower surface of the base plate, whereby the handle opening is positioned between the user and the flat surface when the trigger point and roller therapy device is placed between the user and the flat surface.

2. The device of claim 1, each wheel comprising foam.

3. The device of claim 1, the locking mechanism of each wheeled bracket of the only single pair of wheeled brackets comprising a pin coupled to a bottom plate of the respective wheel bracket, the respective bottom plate supporting the respective pair of wheel support plates extending upwardly from an upper surface of the respective bottom plate of the respective wheeled bracket and the pin of the first wheeled bracket is configured to removably extend inside an opening of the set of first openings to secure the first wheeled bracket with the base at a desired mounting position out of the plurality of mounting positions and the pin of the second wheeled bracket is configured to removably extend inside an opening of the set of second openings to secure the second wheeled bracket with the base at a desired mounting position out of the plurality of mounting positions.

4. The device of claim 1, each wheeled bracket of the only single pair of wheeled brackets comprising a bottom plate, the bottom plate of each wheeled bracket supporting the respective pair of wheel support plates extending upwardly from an upper surface of the respective bottom plate, and each of the bottom plates comprising lateral extensions configured to engage inside the grooves of the pair of guide brackets.

5. The device of claim 1, the base comprises a non-slip layer attached to the lower surface of the base plate.

6. A method for performing trigger point and roller therapy on a psoas muscle, the method comprising:

positioning a trigger point and roller therapy device on a flat surface, the trigger point and roller therapy device comprising a base having a base plate having a periphery, the base plate configured to be positioned on a flat surface during use, and a pair of guide brackets coupled to the base plate, the pair of guide brackets spaced apart and substantially parallel to each other, a pair of grooves, each of the pair of guide brackets defines a groove of the pair of grooves, each groove of the pair of grooves extending through the respective guide bracket from a first open end to a second open end;

only a single pair of wheeled brackets, a wheeled bracket of the only single pair of wheeled brackets is insertable into and removable from the pair of grooves via the first end or the second end, wherein each of the only single pair of wheel brackets are removably coupled to the base and configured to extend inside the grooves of the pair of guide brackets and slide along the grooves to adjust a distance between the wheeled brackets, the only single pair of wheeled brackets located within the periphery of the base plate, each wheeled bracket of the only single pair of wheeled bracket includes a wheel supported on a shaft connected between a pair of wheel support plates of the respective wheeled bracket, each wheel of the pair of wheels supported to a fixed height by the respective pair of wheel support plates, each wheel of the pair of wheels configured to rotate about a central axis of the respective shaft for the respective wheel of the pair of wheels, the central axis of the respective shaft being parallel to the base plate, each of the pair of wheels adapted to contact and apply a pressure on the psoas muscle of a body of a user to enable myofascial release;

each wheel of the wheels is configured to roll forward and backward in a direction perpendicular to the respective central axis responsive to the user urging their body forward and backward while the base remains stationary on a flat surface; and wherein the base plate comprising a plurality of opening arrayed along a central longitudinal axis of the base plate to enable mounting of each of the only single pair of wheeled brackets at a plurality of mounting positions, each wheeled bracket of the only single pair of wheeled brackets comprising a locking mechanism configured to selectively engage one of the plurality of openings to secure the respective wheeled bracket at a desired mounting position of the plurality of mounting positions, the plurality of openings comprising a set of first openings to enable mounting of a first wheeled bracket of the only single pair of wheeled brackets at the plurality of mounting positions and a set of second openings to enable the mounting of a second wheeled bracket of the only single pair of wheeled brackets at the plurality of mounting positions, wherein the base plate comprising a handle opening defining a handle portion, the handle opening configured to allow the user's fingers to be inserted through to grip the base plate, the handle opening extends through an upper surface of the base plate and a lower surface of the base plate, whereby the handle opening is positioned between the user and the flat surface when the trigger point and roller therapy device is placed between the user and the flat surface;

adjusting a distance between the only single pair of wheeled brackets to a desired distance corresponding to a psoas muscle area of a user;

positioning the psoas muscle area of the user on the pair of wheels of the only single pair of wheeled brackets such that the contact surface of each wheel of the pair of wheels concentrates the user's body weight as trigger point pressure directly onto the psoas muscle area; and selectively urging the body of the user forward and backward over the pair of wheels to roll each wheel of the pair of wheels in a direction perpendicular to the central axis of the respective shaft for the respective wheel of the pair of wheels while the base remains stationary on the flat surface, providing roller therapy to tissue adjacent to the psoas muscle area.

* * * * *